(12) United States Patent
Bucknor et al.

(10) Patent No.: US 7,727,100 B2
(45) Date of Patent: Jun. 1, 2010

(54) HYBRID POWERTRAIN WITH EFFICIENT ELECTRIC-ONLY MODE

(75) Inventors: Norman K. Bucknor, Troy, MI (US); Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 379 days.

(21) Appl. No.: 11/832,331

(22) Filed: Aug. 1, 2007

(65) Prior Publication Data

US 2009/0036246 A1   Feb. 5, 2009

(51) Int. Cl.
   *H02K 7/10* (2006.01)
   *H02K 7/18* (2006.01)
   *F02D 25/00* (2006.01)
   *F16H 3/72* (2006.01)
   *F16H 37/06* (2006.01)
   *B60K 6/20* (2007.10)
   *B60K 1/00* (2007.10)
   *B60K 16/00* (2006.01)

(52) U.S. Cl. .............. 475/5; 475/8; 903/907; 903/910; 903/913; 903/951; 180/65.21; 180/65.31; 180/65.6; 290/1 C; 290/4 C

(58) Field of Classification Search .......... 475/5, 475/8; 903/903, 907, 909, 910, 951, 913; 180/65.21, 65.31, 65.6, 65.7; 290/1 C, 4 R, 290/4 C
See application file for complete search history.

(56) References Cited

U.S. PATENT DOCUMENTS

| | | | |
|---|---|---|---|
| 5,643,119 A | | 7/1997 | Yamaguchi et al. |
| 6,048,289 A | * | 4/2000 | Hattori et al. .............. 477/15 |
| 6,392,380 B2 | * | 5/2002 | Furukawa et al. ........... 320/104 |
| 6,886,648 B1 | * | 5/2005 | Hata et al. ............. 180/65.235 |
| 6,953,409 B2 | | 10/2005 | Schmidt et al. |
| 7,101,298 B2 | | 9/2006 | Sowul et al. |
| 7,220,202 B2 | * | 5/2007 | Singh et al. .................... 475/5 |
| 7,338,401 B2 | * | 3/2008 | Klemen et al. ................. 475/5 |
| 7,373,933 B2 | * | 5/2008 | Kamada et al. ......... 123/568.21 |
| 2002/0112901 A1 | * | 8/2002 | Yamaguchi et al. ........ 180/65.2 |
| 2005/0137042 A1 | | 6/2005 | Schmidt et al. |
| 2006/0025259 A1 | | 2/2006 | Klemen et al. |
| 2006/0046886 A1 | | 3/2006 | Holmes et al. |
| 2006/0111213 A1 | | 5/2006 | Bucknor et al. |
| 2009/0082171 A1 | * | 3/2009 | Conlon et al. .................. 477/5 |

\* cited by examiner

*Primary Examiner*—Tisha D Lewis
(74) *Attorney, Agent, or Firm*—Quinn Law Group, PLLC

(57) ABSTRACT

A hybrid powertrain includes a hybrid electro-mechanical transmission and a power source. A planetary gear set having a first, a second, and a third member connects the power source with a first and a second motor/generator. A battery is operatively connected to the motor/generators for receiving power therefrom and delivering power thereto. An input member rotates with the first member, the first motor/generator rotates with the second member, and the second motor/generator rotates with the output member. A first torque-transmitting mechanism is engagable to connect the second motor/generator for rotation with the third member. The battery and the second motor/generator provide an electric-only operating mode to power the output member when the first torque-transmitting mechanism is not engaged; the power source, planetary gear set and first motor/generator thereby being disconnected from the output member during the electric-only operating mode to prevent parasitic drag.

10 Claims, 3 Drawing Sheets

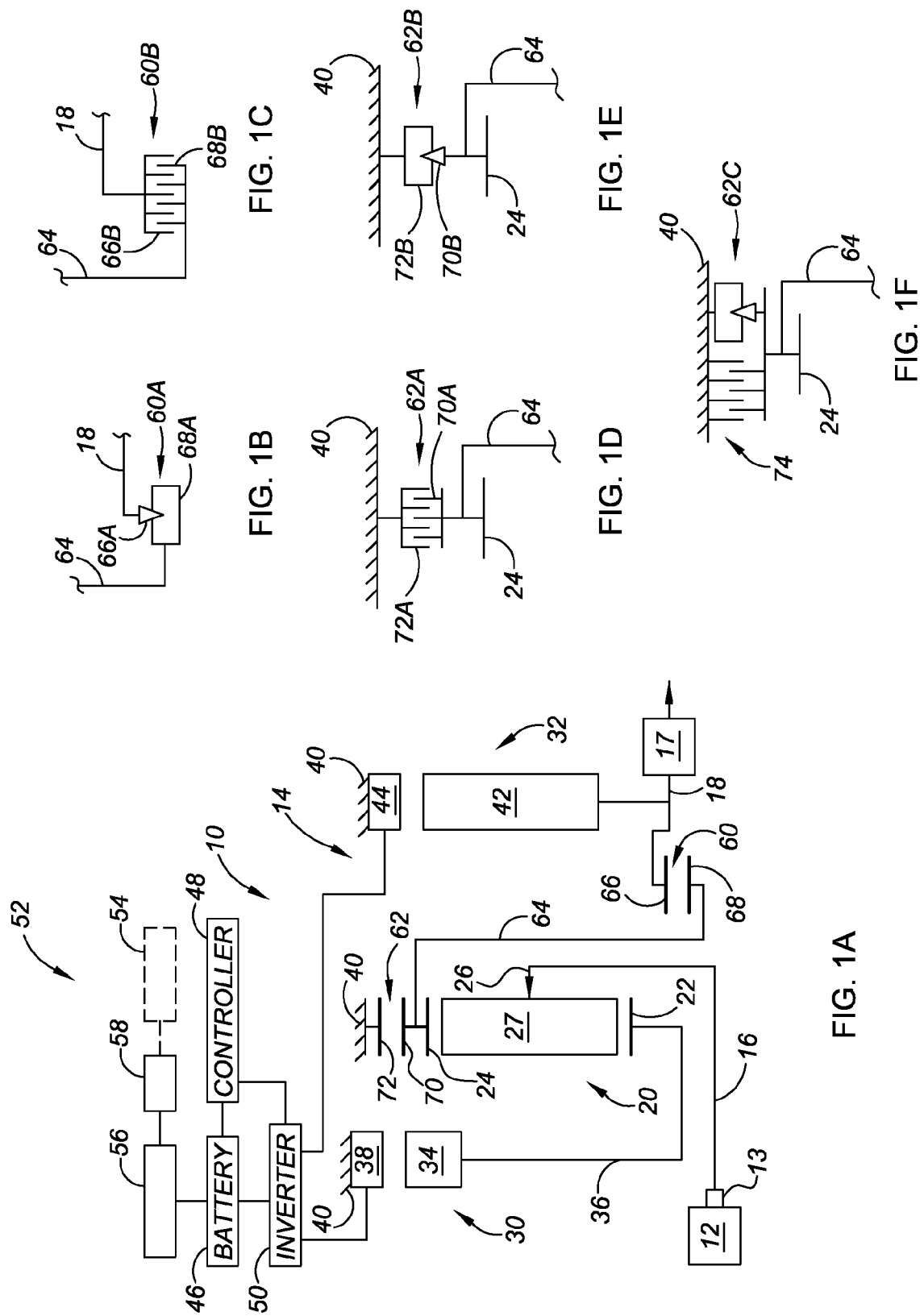

HYBRID POWERTRAIN WITH EFFICIENT ELECTRIC-ONLY MODE

TECHNICAL FIELD

The invention relates to a hybrid electromechanical powertrain having an efficient electric-only mode.

BACKGROUND OF THE INVENTION

Hybrid vehicle powertrains utilize electrically-variable transmissions that combine the use of electric motors and conventional engine power to produce a more efficient vehicle via: (i) engine start-stop operation; (ii) more efficient engine operating points; and (iii) recapture of vehicle kinetic energy into a storage battery by means of regenerative braking. Some hybrid powertrains have an "input-split" architecture, whereby the engine power is split between a direct mechanical connection to the output wheels and an electric generator, with the latter both charging the onboard battery and/or delivering power to a motor connected to the output wheels. Operation with such a powerflow arrangement is referred to as an input-split operating mode. The transmission also functions as an electrically variable transmission (EVT), enabling more optimal engine operating speed and load. Some EVTs offer two EVT modes, as well as a number of fixed gear ratios, as in a conventional automatic transmission.

The intended operating mode of the aforementioned architectures is to blend the use of the conventional engine and electric motor/generators in the most efficient way possible. Therefore, unlike a purpose-built electric vehicle (EV), input-split EVT architectures are not designed to operate for an extended period of time using only battery power, and consequently are not as efficient in such an electric-only operating mode.

SUMMARY OF THE INVENTION

A hybrid powertrain is provided with a modified input-split architecture such that the powertrain has both an efficient electric-only (i.e., battery-powered) operating mode, and at least one efficient conventional hybrid vehicle operating mode. Preferably, the powertrain is suitable for a plug-in hybrid vehicle. A "plug-in" hybrid vehicle is a vehicle with a hybrid powertrain that includes a battery that can be recharged by an offboard power source. It is desirable that a plug-in hybrid vehicle is able to function both as an electric vehicle (using only battery power) with significant battery-only range and as a conventional hybrid vehicle when available battery energy is low.

The hybrid powertrain includes a hybrid electromechanical transmission and a power source, such as an engine. The electromechanical transmission includes an input member connected with the power source and an output member. A planetary gear set having a first, a second, and a third member connects the power source with a first and a second motor/generator. Each of the power source and the motor/generators are operatively connected to a different one of the first, the second, and the third members. A battery is operatively connected to the motor/generators for receiving power therefrom and delivering power thereto. The input member is operatively connected with the first member, the first motor/generator is operatively connected for rotation with the second member, and the second motor/generator is operatively connected for rotation with the output member. A first torque-transmitting mechanism is engagable to connect the second motor/generator for rotation with the third member. The battery and the second motor/generator provide an electric-only operating mode to power the output member when the first torque-transmitting mechanism is not engaged, the power source, planetary gear set and first motor/generator thereby being disconnected from the output member during the electric-only operating mode to prevent parasitic drag of these components. Preferably, the first member is a carrier member, the second member is a sun gear member, and the third member is a ring gear member.

By powering the engine and engaging the first torque-transmitting mechanism, the powertrain can transition from the electric-only operating mode to an input-split operating mode, preferably to control the speed of engagement of the first torque-transmitting mechanism by using the first motor/generator as a motor to control the speed of the third member of the planetary gear set.

Preferably, a second torque-transmitting mechanism is provided that grounds the third member so that power can flow from the engine through the planetary gear set to the first motor/generator, to the battery 46 and then sent from the battery to the second motor generator, establishing a series hybrid operating mode.

A method of operating a powertrain includes providing the first torque-transmitting mechanism described above, directing the stored electrical to the second motor/generator to establish the electric-only operating mode, with the first torque-transmitting mechanism disengaged during the electric-only operating mode. The method also includes powering the engine during the electric-only operating mode, with the first torque-transmitting mechanism being either automatically or selectively engaged (depending on whether it is an overrunning one-way clutch or a selectively engagable clutch capable of transmitting torque in two directions, such as a friction plate clutch) to establish an input-split operating mode. Furthermore, the method may include selectively engaging a second torque-transmitting mechanism that grounds the member of the planetary gear set connectable to the second motor/generator, powering the engine, and controlling the first motor/generator to function as a generator, to thereby establish a series hybrid operating mode. To switch from the series hybrid operating mode to the input-split operating mode, the first motor/generator is controlled to operate as a motor to synchronize the speed of the member of the planetary gear set connectable with the second motor/generator with the speed of the second motor/generator.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1A is a schematic perspective illustration of a powertrain within the scope of the invention;

FIG. 1B is a schematic perspective illustration of one embodiment of a first torque-transmitting mechanism used in the powertrain of FIG. 1A;

FIG. 1C is a schematic perspective illustration of another embodiment of the first torque-transmitting mechanism used in the powertrain of FIG. 1A;

FIG. 1D is a schematic perspective illustration of one embodiment of a second torque-transmitting mechanism used in the powertrain of FIG. 1A;

FIG. 1E is a schematic perspective illustration of another embodiment of the second torque-transmitting mechanism used in the powertrain of FIG. 1A;

FIG. 1F is a schematic perspective illustration of the second torque-transmitting mechanism of FIG. 1E with an optional additional brake-type torque-transmitting mechanism;

DESCRIPTION OF THE PREFERRED EMBODIMENTS

Figure 2A:
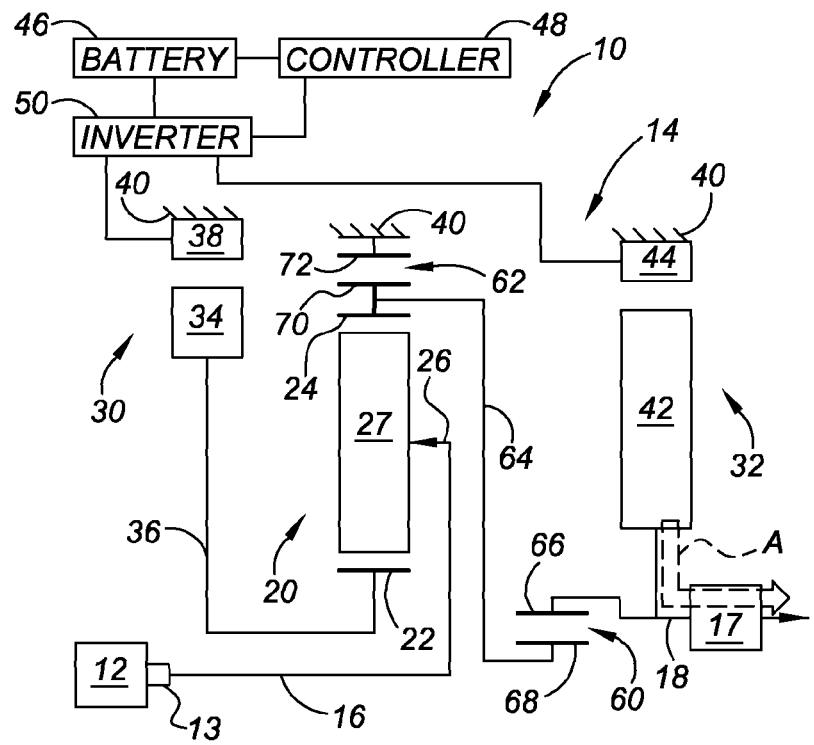
FIG. 2A is a schematic perspective illustration of the powertrain of FIG. 1A in an electric-only operating mode.

Referring to the drawings, wherein like reference numbers refer to like components, FIG. 1A illustrates a hybrid powertrain 10 including a power source, which in this embodiment is an internal combustion engine 12, connected to an electrically variable transmission 14. In some of its operating modes, the transmission 14 is designed to receive at least a portion of its driving power from the engine 12, as described below. The engine 12 has an output shaft 13 drivingly connected with an input member 16 of the transmission 14. A final drive unit 17 is operatively connected to an output member 18 of the transmission 14 for delivering tractive power to the wheels or tracks of a vehicle.

The electrically variable transmission 14 also includes a planetary gear set 20 having a sun gear member 22, a ring gear member 24, and a carrier member 26 that rotatably supports a plurality of pinion gears 27 that intermesh with both the ring gear member 24 and the sun gear member 22. The input member 16 is connected for rotation with the carrier member 26.

The electrically variable transmission 14 further includes a first motor/generator 30, and a second motor generator 32. The first motor/generator 30 has a rotor 34 rotatably connected with the sun gear member 22 via a hub 36. A stator 38 grounded to a stationary member 40, such as a transmission casing, powers the rotor 34 when the first motor/generator 30 is functioning as a motor and generates electrical power when the first motor/generator 30 is functioning as a generator, as is known. The second motor/generator 32 has a rotor 42 rotatably connected with the output member 18. A stator 44 grounded to the stationary member 40 powers the rotor 42 when the second motor/generator 32 is functioning as a motor and generates electrical power when the second motor/generator 32 is functioning as a generator.

The motor/generators 30, 32 may receive electrical power from or provide electrical power to an energy storage device, such as a battery 46. An electronic controller 48 is in signal communication with the battery 46 and with a power invertor 50 that is also in electrical communication with the stators 38, 44 of the motor/generators 30, 32, respectively. The controller 48 responds to a variety of input signals including vehicle speed, operator demand, the level at which the battery 46 is charged and the power being provided by the engine 12 to regulate the flow of power between the motor/generators 30, 32 and the battery 46 via the inverter 50, which converts between direct current provided or utilized by the battery 46 and alternating current provided or utilized by the stators 38, 44 of the motor/generators 30, 32. An optional offboard power supply system 52 may be connected with the battery 46 for recharging of the battery 46. The offboard power supply system 52 utilizes an offboard power supply 54, an onboard charger 56, and an onboard/offboard interface 58, such as an electrical outlet and plug that permits selective connection of the offboard component (the offboard power supply 54) with the onboard charger 56. The offboard power supply 54 is shown in phantom in FIG. 1A to indicate that it is offboard, and not an integrated component of the powertrain 10. As used herein, "onboard" refers to a component integrated within the powertrain 10 such that it is carried with the powertrain 10 on a moving vehicle powered by the powertrain 10. "Offboard" refers to a component not integrated in and not carried with the powertrain 10 as it moves, but that may be connected to the powertrain 10.

The onboard charger 56 is connected with an onboard battery 46. The transmission 14 may be referred to as a plug-in hybrid transmission as it is equipped with such an offboard power supply system 52. The charger 56 is an onboard conductive-type charger that regulates the flow of electrical power from the offboard power supply 54 to the battery 46. When the battery 46 is sufficiently recharged, the connection through interface 58 is terminated, and the recharged battery 46 is then used as discussed herein to power the motor/generators 30, 32, such as in an electric-only mode discussed below. Other types of offboard power supply systems may be used in lieu of offboard power supply system 52, including plug-in systems that utilize an offboard conductive-type charger with an offboard power supply, and those that utilize an offboard inductive charger and offboard power supply.

The transmission 14 has a first torque-transmitting mechanism 60 and a second torque-transmitting mechanism 62 which are engagable and disengagable, either automatically or selectively (i.e., under the control of the controller 48) as discussed below, to allow different operating modes of the powertrain 10. The first torque-transmitting mechanism 60 is engagable to connect a hub 64 extending from the ring gear 24 for common rotation with the output member 18. When the first torque-transmitting mechanism 60 is not engaged (as depicted in FIG. 1A), the output member 18 and the second motor/generator 32 can rotate without any physical drag caused by the planetary gear set 20, the first motor/generator 30, or the engine 12, as those components are disconnected from the output member 18 and second motor/generator 32 by the disengaged torque-transmitting mechanism 60.

The first torque-transmitting mechanism 60 is shown in a generic configuration as two separated portions in a disengaged state in FIG. 1A. A first portion 66 rotates commonly with the output member 18 while a second portion 68 rotates commonly with a hub 64. In a first configuration, the first torque-transmitting mechanism 60 may be a one-way clutch, and is represented by one-way clutch 60A in FIG. 1B. A first portion of the clutch 66A connected for rotation with output member 18 overruns a second portion of the clutch 68A when rotating relative to the second half 68A in a forward direction to interrupt torque transfer between the ring gear member 24 and the output member 18, but is engaged to rotate commonly with the second portion 68A and the hub 64 (and ring gear member 24) connected thereto when the hub 64 is rotating such that there is no relative rotation between the portions 66A, 68A, thereby permitting torque-transfer from the ring gear member 24 to the output member 18. Such a one-way clutch 60A is well known to those skilled in the art, and is advantageous as its engagement or disengagement is automatic, requiring no hydraulic or other type of actuation under the control of the controller 48.

In a second configuration, the first torque-transmitting mechanism 60 may be a selectively engagable clutch capable of transmitting torque in two directions. That is, the first torque-transmitting mechanism 60 may be a selectively engaged to transmit torque between the first and second portions 66, 68 regardless of the direction of rotation of the two portions (i.e., the first torque-transmitting mechanism 60 does not overrun in either direction). Well known examples of torque-transmitting mechanisms capable of transmitting torque in two directions are friction plate-type clutches and dog clutches. The first torque-transmitting mechanism 60 is represented by friction plate clutch 60B in FIG. 1C. In such an embodiment, friction plates 66B extending from the output member 18 may be selectively engaged with friction plates 68B extending from the hub 64 by utilizing the controller 48 to control hydraulic pressure acting on a piston that applies pressure to the plates 66B, 68B, as is known.

The second torque-transmitting mechanism 62 is shown in a generic configuration as two separated portions in a disengaged state in FIG. 1A. A first portion 70 of the torque-transmitting mechanism 62 rotates commonly with the ring gear member 24 and the hub 64, while a second portion 72 is grounded to the stationary member 40. The torque-transmitting mechanism 62 may be a selectively-engagable brake-type clutch capable of transmitting torque in two directions, such as a friction plate-type stationary clutch or a band brake, both of which are well known types of torque-transmitting mechanisms. In a first configuration, the second torque-transmitting mechanism 62 may be a friction plate clutch, and is represented by friction plate clutch 62A in FIG. 1D. In such an embodiment, friction plates 70A connected for rotation with the ring gear member 24 and hub 64 may be selectively engaged with reaction plates 72A extending from the stationary member 40 by utilizing the controller 48 to control hydraulic pressure acting on a piston that applies pressure to the plates 70A, 72A, as is known.

In another configuration illustrated in FIG. 1E, the second torque-transmitting mechanism 62 is a one-way clutch 62B having a first portion 70B connected for rotation with the ring gear member 24 and hub 64 that overruns a second portion 72B when the ring gear member 24 rotates in a first direction, referred to as a forward direction, but automatically engages with the second portion 72B, thereby grounding the clutch 62B to the stationary member 40, when torque applied to the ring gear member 24 and hub 64 causes those components to attempt to rotate in a second opposing direction, referred to as a reverse direction. The use of a one-way clutch for the second torque-transmitting mechanism 62, such as one-way clutch 62B is advantageous in that its operation is automatic, and hydraulic pressure and actuators under the control of the controller 48 are not required for its engagement. However, unlike the friction brake 62A of FIG. 1D, the one-way clutch 62B will overrun, and is therefore not able to provide the reaction torque necessary on the ring gear member 24 if the first motor/generator 30 is operated as a motor to start the engine 12.

Referring to FIG. 1F, the second torque-transmitting mechanism 62 may be a one-way clutch 62C, functioning in the same manner as one-way clutch 62B of FIG. 1E, with an additional brake-type torque-transmitting mechanism 74 placed in parallel therewith. The additional brake-type torque-transmitting mechanism 74 may be engaged during engine starting via the first motor/generator 30. This allows the use of the one-way clutch 62C for forward torque transfer, without requiring a separate engine starting assembly, as the brake-type torque-transmitting mechanism 74 can be selectively engaged to provide reaction torque at the ring gear member 24 during engine starting. The brake-type torque-transmitting mechanism 74 may be smaller in capacity than the brake-type torque-transmitting mechanism 62A of FIG. 1D, as it would not be used for other operating modes that require ring gear member 24 to be grounded, such as in the series hybrid operating mode discussed below.

The powertrain 10 is operable in several different operating modes by controlling the operation of the engine 12, the motor/generators 30, 32, and by engagement or disengagement of the torque-transmitting mechanisms 60, 62, whether such is automatic (in the case of a one-way clutch or brake) or selective (in the case of a friction plate clutch or brake). First, the powertrain 10 is operable in an electric-only (i.e., battery-only) operating mode when the engine 12 is off, the torque-transmitting mechanism 62 is not engaged, and the torque-transmitting mechanism 60 is not engaged, as illustrated in FIG. 2A. If the second motor/generator 32 is controlled to operate as a motor powered via electric battery stored in the battery 46 to supply rotary power to the output member 18 (depicted by arrow A), the disengaged torque-transmitting mechanism 60 between the ring gear member 24 and the motor/generator 32 disconnects the output member 18 from the planetary gear set 20, the first motor/generator 30 and the engine 12 when the powertrain 10 is operating in an electric-only mode. By isolating the planetary gear set 20, the engine 12 and the first motor/generator 30 from the driving wheels, vehicle powertrain efficiency is improved since these components are no longer a source of parasitic drag in the powertrain 10. If the first torque-transmitting mechanism 60 is a one-way clutch such as torque-transmitting mechanism 60A of FIG. 1B, it will automatically overrun and be in a disengaged state when the motor/generator 32 is powering the output member 18. If the first torque-transmitting mechanism 60 is a friction clutch capable of transmitting torque in two directions, such as friction plate clutch 60B of FIG. 1C, it will be kept in a disengaged state by the controller 48, which will be programmed to not engage clutch 60B when operating conditions warrant operation in the electric-only operating mode.

Figure 2B:
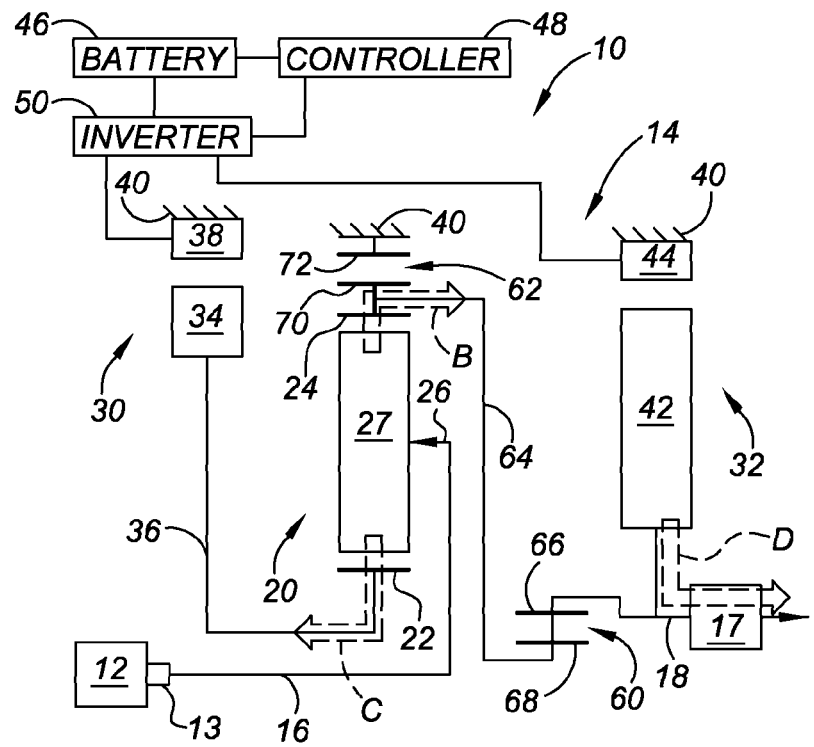
FIG. 2B is a schematic perspective illustration of the powertrain of FIG. 1A in an input-split operating mode.

Additionally, the powertrain 10 is operable in an input-split operating mode when the engine 12 is on, the second torque-transmitting mechanism 62 is not engaged, and the first torque-transmitting mechanism 60 is engaged. The input-split operating mode is illustrated in FIG. 2B with the portions 70, 72 of the second torque-transmitting mechanism 62 appearing disconnected, and the portions 66, 68 of the first torque-transmitting mechanism 60 being engaged as indicated schematically by the vertical line connecting the two portions 66, 68. In the input-split operating mode, the engine 12 provides power to the output member 18 and to the first motor/generator 30 through the planetary gear set 20, as depicted by arrows B and C, respectively. In the simplest preferred embodiment of this invention, the first torque-transmitting mechanism 60 is a one-way clutch such as clutch 60A of FIG. 1B that overruns while the second motor/generator 32 drives the output member 18 (as indicated by arrow D) without driving the ring gear member 24. In the input-split operating mode, the second motor/generator 32 absorbs all power for regenerative braking of a vehicle equipped with powertrain 10. In a plug-in vehicle application, the second motor/generator 32 will be designed with sufficient electrical capability to provide good electric-only mode performance (i.e., sufficient driving torque). The advantage of the one-way clutch 60A over a selectively engagable friction-type clutch such as friction plate clutch 60B is that minimal control system intervention is required to switch between the electric-only mode and the input-split operating mode. When power is sent to the ring gear member 24 via the engine 12, the one-way clutch 60A locks up, allowing the ring gear member 24 to drive the output member 18 so that the transmission 14 operates in an input-split hybrid operating mode. To limit driveline lash, it would be necessary to use the first motor/generator 30 to control the speed of engagement of the one-way clutch 60A by controlling the speed of the ring gear member 24. If the first torque-transmitting mechanism 60 were instead a friction-plate type torque-transmitting mechanism such as 60B of FIG. 1C, it could be utilized for engine-braking, as it could carry torque in a reverse direction to the ring gear member 24, unlike a one-way clutch such as clutch 60A which would overrun.

Figure 2C:
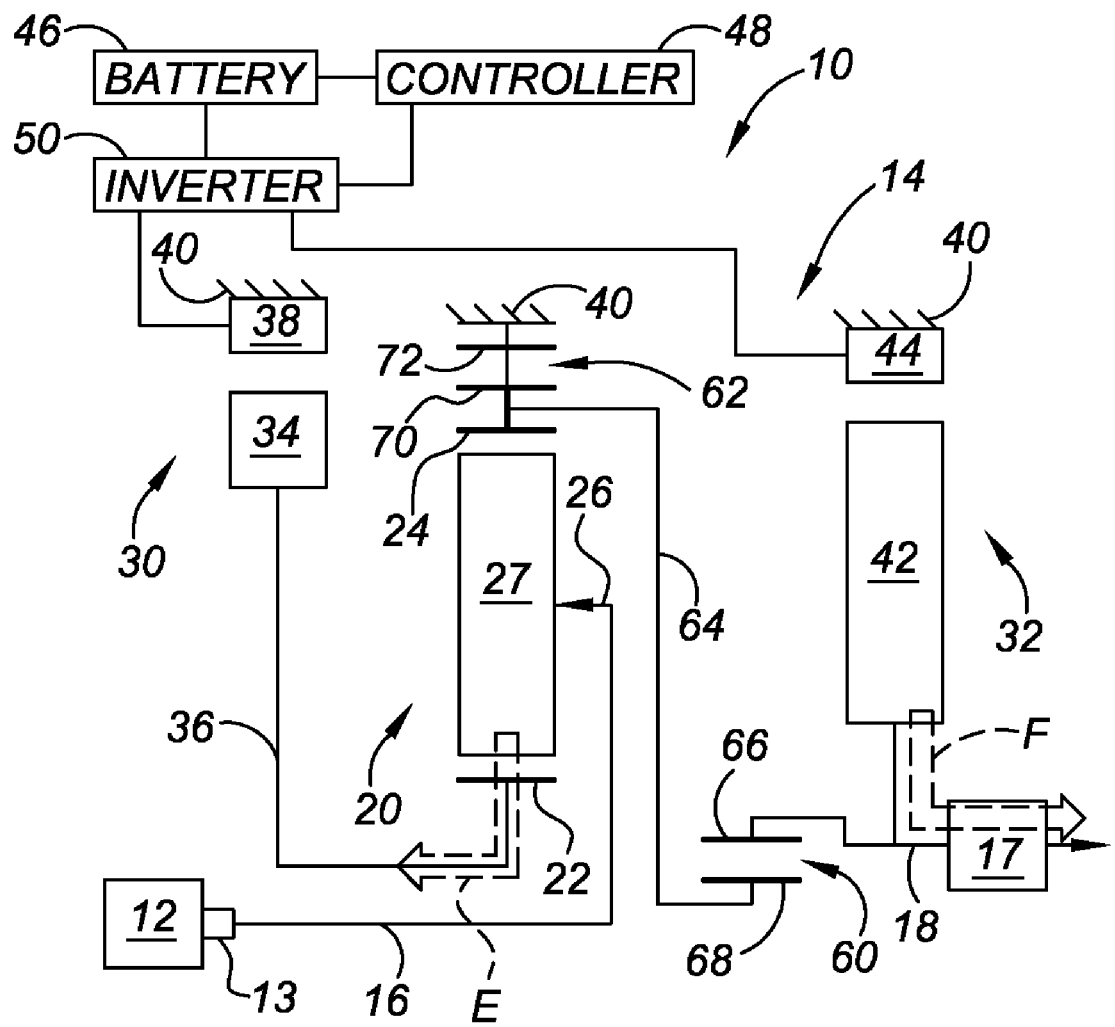
FIG. 2C is a schematic perspective illustration of the powertrain of FIG. 1A in a series hybrid operating mode.

A third operating mode of the powertrain 10 is a series hybrid operating mode, illustrated in FIG. 2C, whereby the engine 12 is used to run the first motor/generator 30 (as indicated by arrow E) in order to charge the battery 46 and/or deliver power to motor/generator 32 (as indicated by arrow F). In this operating mode, engagement of the second torque-transmitting mechanism 62 is necessary in order to ground the ring gear member 24, providing reaction torque, and allowing the engine 12 to send power to the first motor/generator 32 through the planetary gear set 20. With the second torque-transmitting mechanism 62 engaged (as indicated schematically in FIG. 2C by the vertical line connecting the two portions of the second torque-transmitting mechanism 62, the powertrain 10 can run primarily in electric-only operating mode, and the engine 12 can be controlled to be on only as needed to provide recharging of battery 46. In the simplest embodiment the second torque-transmitting mechanism 62 is a one-way clutch such as clutch 62A of FIG. 1D that prevents reverse rotation of the ring gear member 24 when the engine 12 comes on to shift from electric-only operating mode to the input-split operating mode. To transition to the input-split operating mode, torque and speed of the engine 12 as well as the speed of motor/generator 30 can be adjusted such that the ring gear member 24 is rotated in the forward direction until the first torque-transmitting mechanism 60 is engaged.

As per the description of the operating modes above, a method of operating a powertrain such as powertrain 10, described with respect to the components of FIGS. 1A-2C, includes providing a first torque-transmitting mechanism 60 between the second motor/generator 32 and the member (ring gear member 24) of the planetary gear set 20 connected with the second motor/generator 32. The method further includes directing stored electrical power (stored in battery 46) to the second motor/generator 32 to drive the transmission output member 18 to thereby establish an electric-only operating mode, with the first torque-transmitting mechanism 60 being disengaged during the electric-only operating mode so that the second motor/generator 32 and the output member 18 are isolated from the planetary gear set 20, the engine 12 and the first motor/generator 30, thus eliminating drag of these latter components on the output member 18. While directing stored electric power to the second motor/generator 32, the method includes powering the engine 12, with the first torque-transmitting mechanism 60 being either automatically engaged (in the case of a one-way clutch) or selectively engaged (in the case of a clutch capable of transmitting torque in two directions, such as a friction plate-type clutch), thereby directing the engine power to the output member 18 and establishing an input-split operating mode. Instead of an input-split operating mode, a series hybrid operating mode may be established following the electric-only operating mode by selectively engaging the second torque-transmitting mechanism 62 to ground the ring gear member 24, powering the engine 12, and controlling the first motor/generator 30 to act as a generator that provides the electric power to the battery 46. The method may further include switching from the electric-only operating mode to the input-split operating mode by controlling the first motor/generator 30 to operate as a motor to synchronize the rotational speed of the ring gear member 24 with the rotational speed of the second motor/generator 32.

While the best modes for carrying out the invention have been described in detail, those familiar with the art to which this invention relates will recognize various alternative designs and embodiments for practicing the invention within the scope of the appended claims.

The invention claimed is:

1. A hybrid electro-mechanical transmission connectable with a power source, comprising:
    an input member connected with the power source;
    an output member;
    a planetary gear set having a first, a second, and a third member;
    first and second motor/generators;
    a battery operatively connected to the motor/generators for receiving power therefrom and delivering power thereto;
    wherein the input member is operatively connected with the first member; wherein the first motor/generator is operatively connected for rotation with the second member;
    wherein the second motor/generator is operatively connected for rotation at the same speed as the output member;
    a first torque-transmitting mechanism engagable to connect the second motor/generator for rotation with the third member;
    wherein the battery and second motor/generator provide an electric-only operating mode to power the output member when the first torque-transmitting mechanism is not engaged; the power source, planetary gear set and first motor/generator thereby being disconnected from the output member during the electric-only operating mode to prevent parasitic drag;
    wherein the first torque-transmitting mechanism is a one-way clutch that is automatically in a disengaged, over-running state during the electric-only operating mode; and
    wherein the transmission has no torque-transmitting mechanisms engaged during the electric-only operating mode.

2. The hybrid electro-mechanical transmission of claim 1, wherein the battery, the second motor/generator, and the power source provide an input-split operating mode in which the second motor/generator and the power source power the output member and the first torque-transmitting mechanism is engaged.

3. The hybrid electro-mechanical transmission of claim 1, further comprising:
    a stationary member;
    a second torque-transmitting mechanism engagable to ground the third member of the planetary gear set to the stationary member; and wherein the power source, first motor/generator, and second motor/generator provide a series hybrid operating mode in which the second torque-transmitting mechanism is engaged and the power source is providing power, with the first motor/generator powered by the power source to operate as a generator to send electrical power to the second motor/generator via the battery, and with the second motor/generator operating as a motor.

4. The hybrid electro-mechanical transmission of claim 3, wherein the power source is an engine; and wherein the second torque-transmitting mechanism is a brake capable of transmitting torque in two directions and that selectively grounds the third member to the stationary member when the first motor/generator is operated as a motor to start the engine.

5. The hybrid electro-mechanical transmission of claim 3, wherein the second torque-transmitting mechanism is a one-way clutch.

6. The hybrid electro-mechanical transmission of claim 1, wherein the battery is configured to be connectable to an offboard power supply for recharging the battery.

7. A hybrid powertrain comprising:
an engine;
an electrically-variable transmission having:
an input member connected for rotation with the engine;
an output member;
a stationary member;
a planetary gear set having a ring gear member, a sun gear member, and a carrier member rotatably supporting a plurality of pinion gears that intermesh with both the ring gear member and the sun gear member;
first and second motor/generators; wherein the first motor/generator is operatively connected for rotation with the sun gear member; wherein the second motor/generator is operatively connected for rotation with the output member;
a battery operatively connected to the first and second motor/generators for receiving power therefrom and delivering power thereto; wherein the battery is configured to be operatively connectable to an offboard power supply for recharging the battery;
a one-way clutch engagable to interconnect the ring gear member and the output member; wherein the one-way clutch automatically engages when the ring gear member rotates in a forward direction and overruns when the ring gear member does not rotate;
a second torque-transmitting mechanism selectively engagable by a controller to ground the ring gear member to the stationary member;
a one-way brake clutch automatically engagable to ground the ring gear member to the stationary member;
wherein the battery and the second motor/generator provide an electric-only operating mode when the one-way clutch, the second torque-transmitting mechanism and the one-way brake clutch are not engaged and the engine is off, the one-way clutch thus disconnecting the planetary gear set, the engine, and the first motor/generator from the output member during the electric-only operating mode;
wherein the one-way brake clutch is automatically engaged when the battery and the first motor/generator are used to start the engine;
wherein the engine, the battery, and the second motor/generator provide an input-split operating mode when the engine is on, the one-way clutch is engaged, and the one-way brake clutch and the second torque-transmitting mechanism are not engaged; and
wherein the engine, the first motor/generator, the battery, and the second motor/generator provide a series hybrid operating mode when the engine is on, the one-way clutch is not engaged, the second torque-transmitting mechanism is engaged and the one-way brake clutch is not engaged.

8. A method of operating a hybrid electro-mechanical powertrain having an engine, a transmission with a first motor/generator, a second motor/generator, and a planetary gear set; wherein the engine and the motor/generators are each connectable to different members of the planetary gear set, the method comprising:
providing a first engagable and disengagable torque-transmitting mechanism between the second motor/generator and the member of the planetary gear set connected with the second motor/generator;
directing stored electrical power to the second motor/generator to drive a transmission output member to thereby establish an electric-only operating mode;
wherein the first torque-transmitting mechanism is disengaged during said directing such that the second motor/generator and output member are isolated from the engine, the planetary gear set, and the first motor/generator, thereby eliminating parasitic drag;
wherein the first torque-transmitting mechanism is a first one-way clutch that automatically overruns during the electric-only operating mode such that the second motor/generator and output member are automatically isolated from the engine, the planetary gear set, and the first motor/generator during the electric-only operating mode due to overrunning of the one-way clutch;
powering the engine during said directing stored electrical power to the second motor/generator; and wherein the first torque-transmitting mechanism automatically engages during said powering the engine to thereby establish an input-split operating mode.

9. The method of claim 8, further comprising:
selectively engaging a second torque-transmitting mechanism to ground the member of the planetary gear set connectable to the second motor/generator;
powering the engine; and
controlling the first motor/generator to act as a generator that provides the electric power to the battery, thereby establishing a series hybrid operating mode.

10. The method of claim 9, further comprising:
switching from the electric-only operating mode to the input-split operating mode by controlling the first motor/generator to operate as a motor, thereby synchronizing rotational speed of the member of the planetary gear set connectable with the second motor/generator with the rotational speed of the second motor/generator.

* * * * *